US012549887B2

(12) United States Patent
Kim

(10) Patent No.: US 12,549,887 B2
(45) Date of Patent: Feb. 10, 2026

(54) HEADSET

(71) Applicants: Headsets Korea Inc., Gyeonggi-Do (KR); PCI Race Radios, Cypress, CA (US)

(72) Inventor: Jong Ho Kim, Gyeonggi-do (KR)

(73) Assignees: Headsets Korea Inc., Gyeonggi-do (KR); PCI Race Radios, Cypress, CA (US)

( * ) Notice: Subject to any disclaimer, the term of this patent is extended or adjusted under 35 U.S.C. 154(b) by 162 days.

(21) Appl. No.: 18/676,510

(22) Filed: May 29, 2024

(65) Prior Publication Data

US 2025/0071469 A1 Feb. 27, 2025

(30) Foreign Application Priority Data

Aug. 21, 2023 (KR) ........................ 10-2023-0109306

(51) Int. Cl.
*H04R 1/10* (2006.01)
*H04R 1/02* (2006.01)

(52) U.S. Cl.
CPC ......... *H04R 1/1083* (2013.01); *H04R 1/1008* (2013.01); *H04R 1/1075* (2013.01); *H04R 1/023* (2013.01)

(58) Field of Classification Search
CPC .. H04R 1/1083; H04R 1/1008; H04R 1/1075; H04R 1/023; H04R 1/1066; H04R 5/0335; H04R 1/10; H04R 1/32; H04R 1/323; H04R 1/34; H04R 1/345
See application file for complete search history.

(56) References Cited

U.S. PATENT DOCUMENTS

| | | | | | |
|---|---|---|---|---|---|
| 2,468,721 | A * | 4/1949 | Volkmann | H04R 1/1008 381/372 |
| 3,112,005 | A * | 11/1963 | Shaw | H04M 1/03 181/129 |
| 2006/0188121 | A1* | 8/2006 | Tsunoda | H04R 1/1008 381/370 |
| 2019/0020947 | A1* | 1/2019 | Dekel | H04R 1/2865 |
| 2021/0084400 | A1* | 3/2021 | Tsubone | H04R 1/1058 |
| 2025/0301249 | A1* | 9/2025 | Deng | H04R 1/1025 |

* cited by examiner

*Primary Examiner* — Carolyn R Edwards
*Assistant Examiner* — Mark Fischer
(74) *Attorney, Agent, or Firm* — IP & T GROUP LLP

(57) ABSTRACT

Proposed is a headset including a head band provided with a head pad, a length adjustment member including a plurality of length adjustment members respectively mounted on both sides of the head band, an ear cup which is mounted on the length adjustment member and in which the speaker is mounted by a baffle, an ear pad mounted on the ear cup, a rotation member mounted on one of the ear cups and provided with a microphone, and a cable mounted on the ear cup around the rotation member and provided with a connection cable that is connected to the speaker and the microphone. More particularly, the baffle includes a baffle body having a first mounting portion, a second mounting portion, and a second plate, and includes a baffle plate. A space of the baffle body includes a focusing space portion, an emission space portion, and a dispersion space portion.

6 Claims, 8 Drawing Sheets

【FIG. 1】
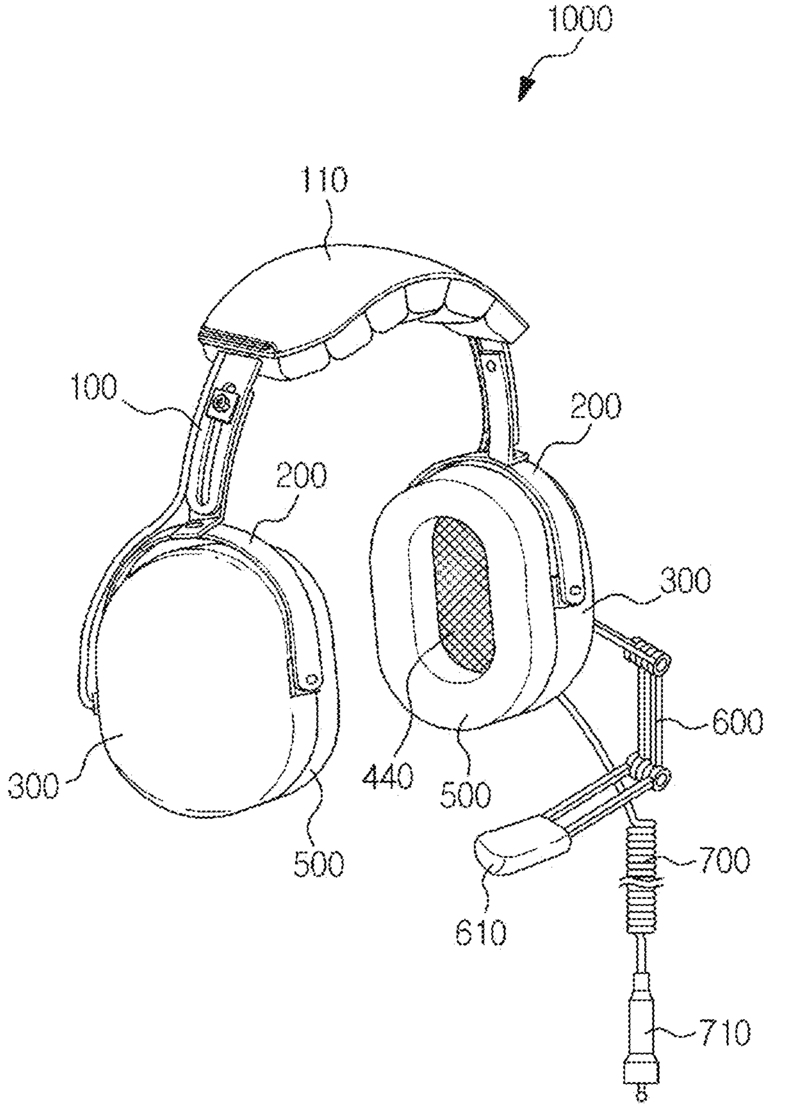

【FIG. 2】
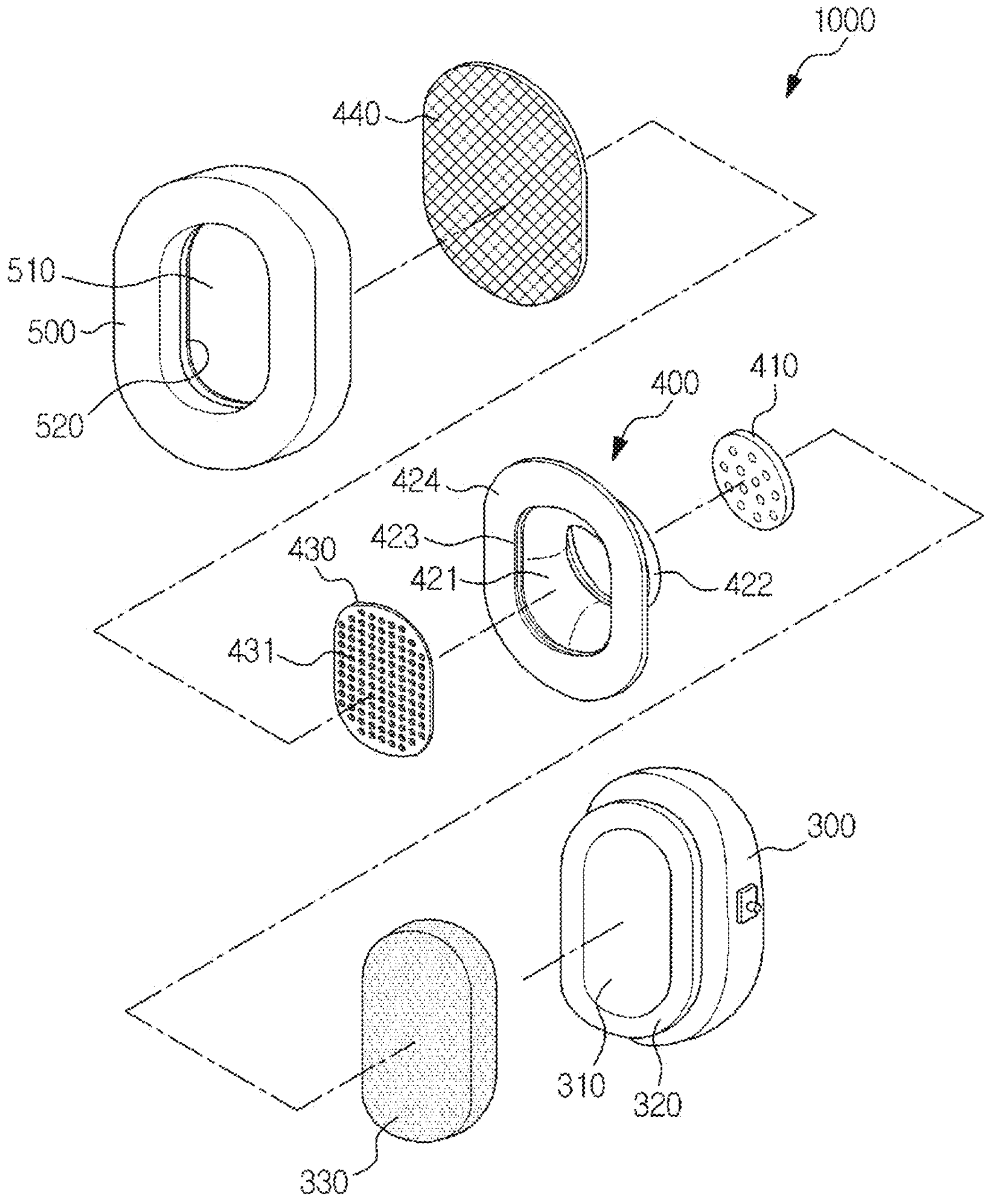

【FIG. 3】
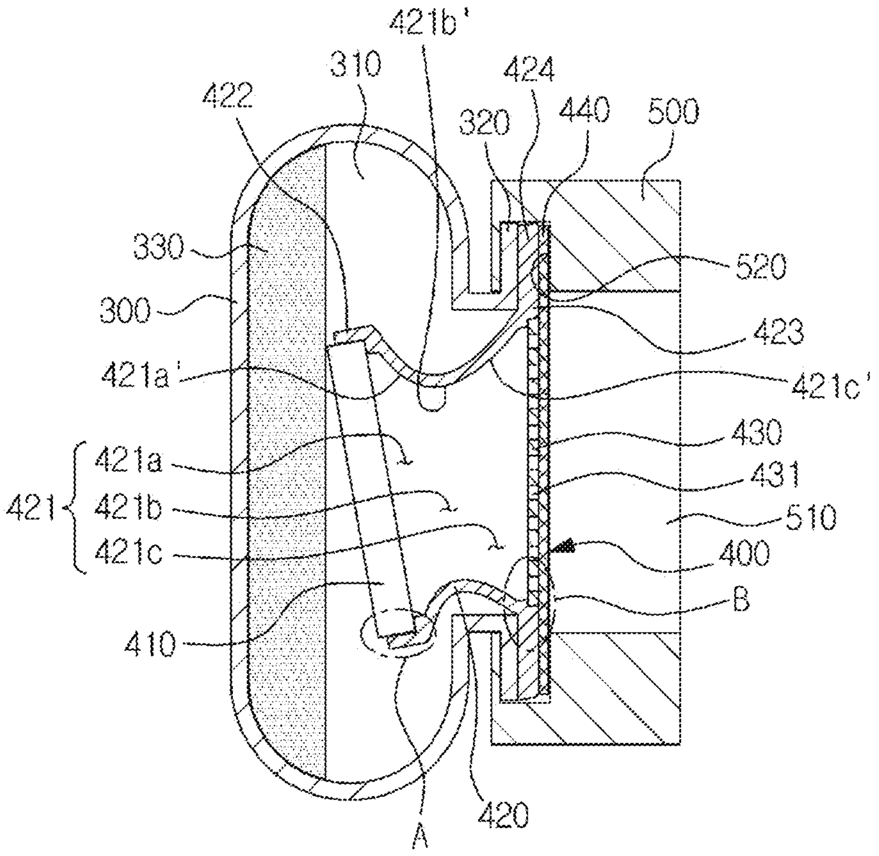
【FIG. 4】
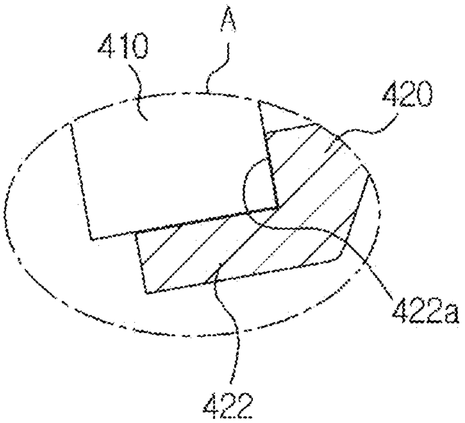

【FIG. 5】
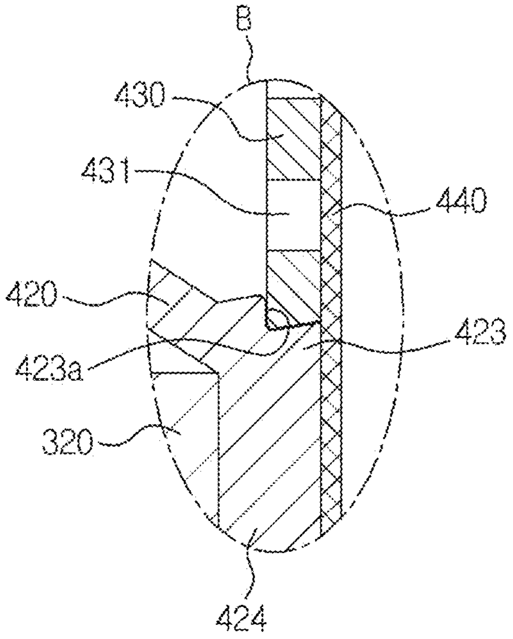

【FIG. 6】
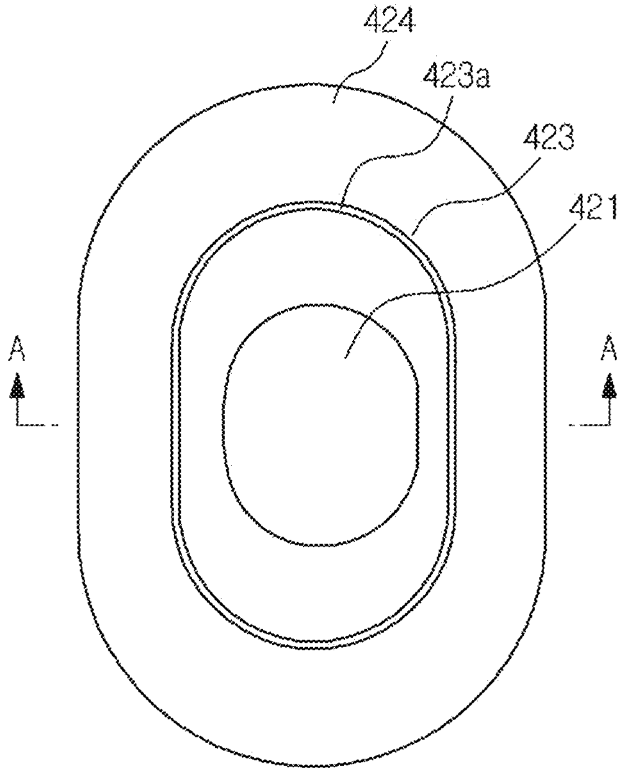
【FIG. 7】
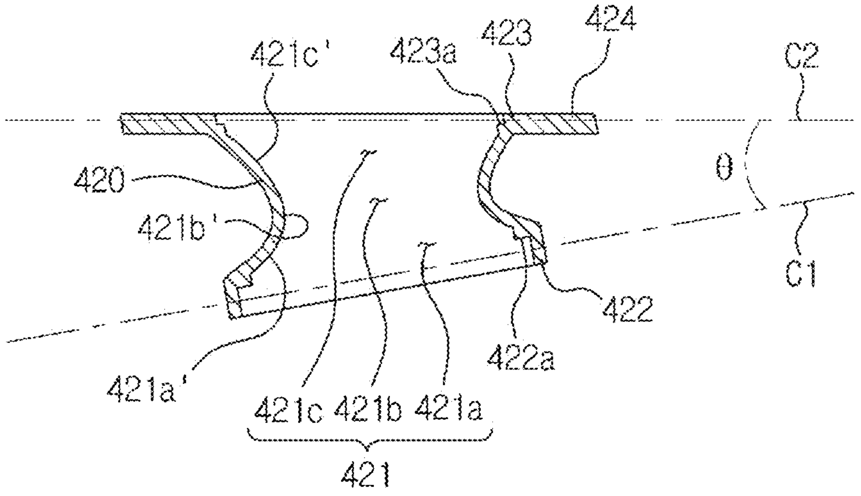

【FIG. 8】
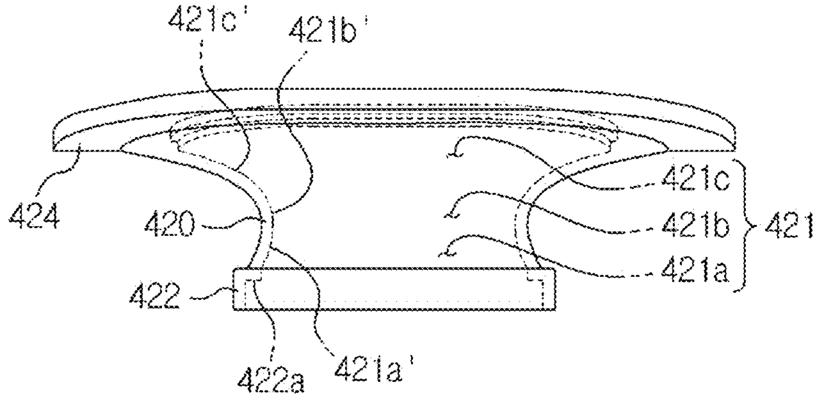
【FIG. 9】
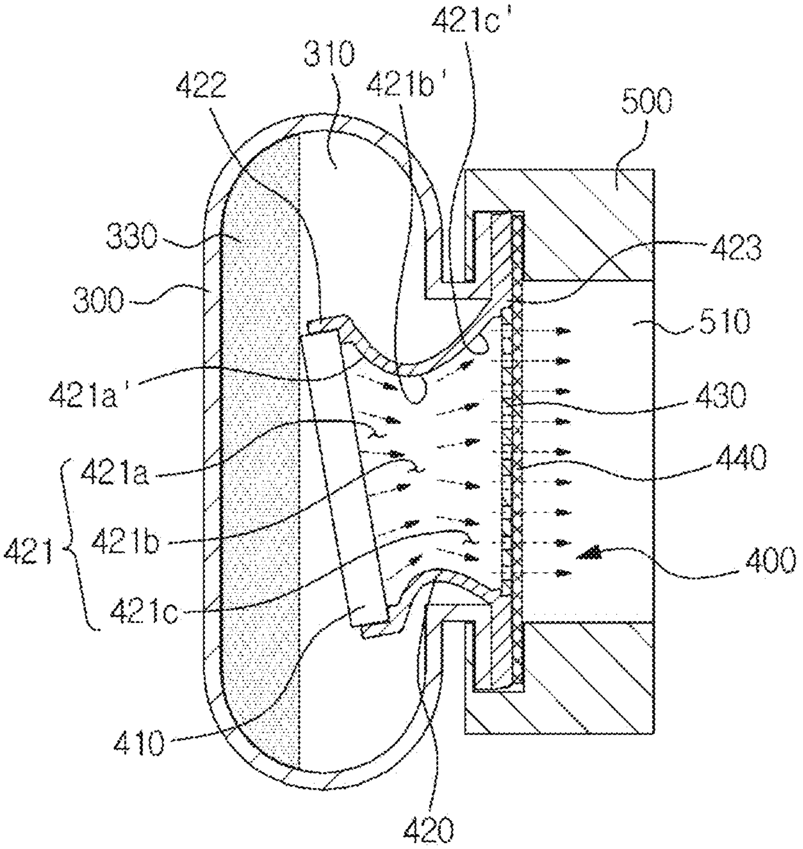

【FIG. 10】
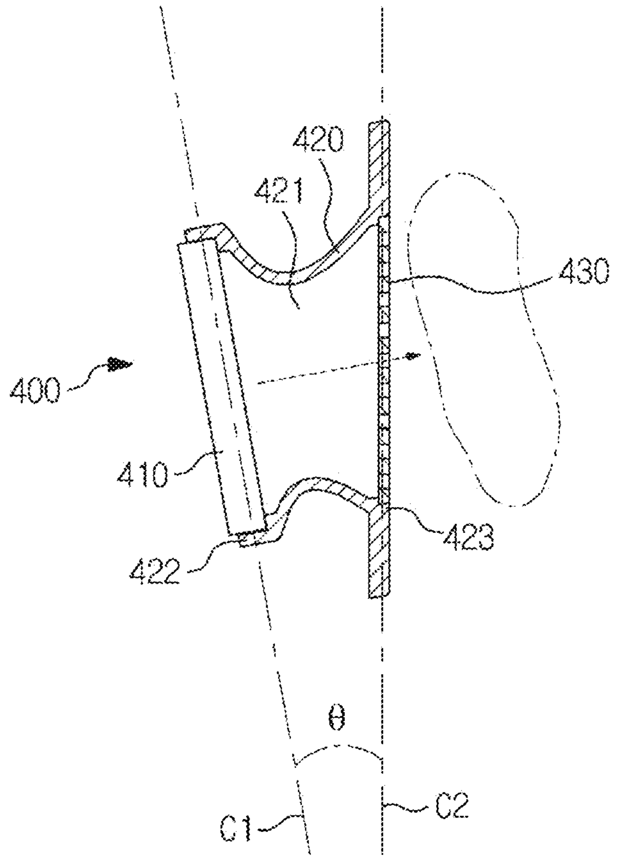
【FIG. 11】
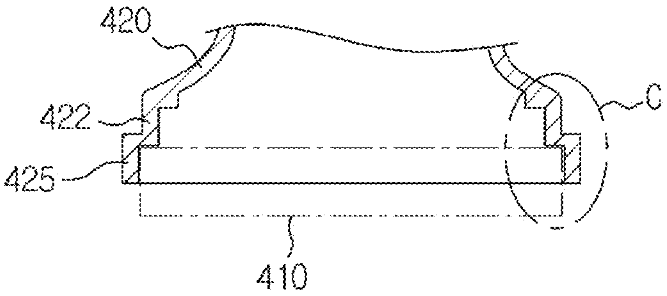

【FIG. 12】
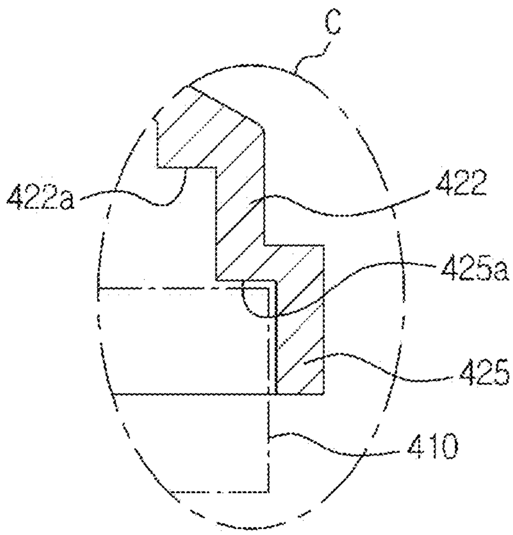

HEADSET

CROSS REFERENCE TO RELATED APPLICATION

The present application claims priority to Korean Patent Application No. 10-2023-0109306, filed on Aug. 21, 2023, the entire contents of which are incorporated herein for all purposes by this reference.

BACKGROUND OF THE INVENTION

Field of the Invention

The present disclosure relates to a headset configured to transmit sound output from a speaker mounted in an ear cup to a user's ear.

Description of the Related Art

Generally, a headset is worn on a user's head when the user is talking on a phone with another person or listening to music. Such a headset is connected to a device such as a phone, a sound device, or the like by a wired manner or a wireless manner, and is configured to receive a voice signal and is also configured to play a voice signal through a speaker.

In addition, when the headset is used, the user can freely use both hands while talking on the phone with another person or listening to music, so that the user can enjoy reading while the user is listening to entertainment games or music.

In this regard, a headphone for blocking electromagnetic waves and for enhancing a middle-high-pitched sound band is proposed in Patent Document 1. The headphone of Patent Document 1 includes: at least one of a woofer and a tweeter connected to a substrate; an external case formed of a partition wall and a molding material for shielding electromagnetic waves, the partition wall in which the woofer and the tweeter are embedded, seated, and fixed and which forms a sound synthesis chamber where each sound output from the woofer and the tweeter is combined, the molding material forming a plurality of sound holes outputting the sound to the outside; and a baffle which is connected to the external case and in which a sound hole in communication with the sound holes formed in the external case.

However, in Patent Document 1, when sound is output from the woofer, a part of the sound is introduced into an inner space of the external case positioned at a rear side of the woofer, and the sound is transformed into noise while the sound is moving in the inner space of the external case and also noise generated from the outside is introduced into the inner space of the external case.

For this reason, there is a concern that sound output from the woofer may be mixed with noise in the sound synthesis chamber, and there is a concern that sound with reduced sound quality may be provided to the user's ear.

DOCUMENT OF RELATED ART (Patent Document 1) Korean Utility Model No. 20-0252594 (registered on Oct. 19, 2001)

SUMMARY OF THE INVENTION

Accordingly, the present disclosure has been made keeping in mind the above problems occurring in the related art, and an objective of the present disclosure is to provide a headset configured to prevent sound output from a speaker from being mixed with noise from inside an ear cup, the headset being provided with a baffle configured such that sound output from the speaker to be clearly and loudly heard by a user's ear.

In order to achieve the objective described above, there is provided a headset including: a head band which is worn on a user's head and which is provided with a head pad provided at a center of the head band; a length adjustment member including a plurality of length adjustment members mounted on both sides of the head band such that the length adjustment members are capable of being moved along a longitudinal direction of the head band; an ear cup which includes a plurality of ear cups respectively mounted on the length adjustment members such that the ear cups are capable of being rotated and in which a speaker mounted in a baffle is embedded; an ear pad including a plurality of ear pads respectively mounted on the ear cups such that the ear pads face each other; a rotation member mounted on one of the ear cups at an opposite side of the ear pad such that the rotation member is capable of being rotated, the rotation member being provided with a microphone; and a cable mounted on the ear cup around the rotation member and provided with a connection terminal connected to the speaker and the microphone. The ear cup is configured such that a space in which the speaker mounted in the baffle is embedded is formed inside the ear cup, a first side of the space is open, and a first plate is formed on an open entrance of the space. Furthermore, the ear pad has a through-hole formed through a center thereof, and a fitting groove to which the first plate is fitted is formed on a first side of the through-hole. Furthermore, the baffle includes: a baffle body, the baffle body being inserted into the space of the ear cup, having a space which is formed inside the baffle body and which has both sides open, having a first mounting portion which is formed on an open entrance of a first side of the space and which has a locking step where the speaker is locked and fitted thereto, having a second mounting portion which is formed on an open entrance of an opposite side of the space and which has a locking step, and having a second plate which is formed on an outer surface of the second mounting portion and which is fitted to the fitting groove of the ear pad while the second plate is attached to the first plate; and a baffle plate which is locked on the locking step and which is fitted to the second mounting portion, the baffle plate having an outer surface provided with a plurality of through-holes. Furthermore, the space includes: a focusing space portion adjacent to the first mounting portion, the focusing space portion being formed such that the focusing space portion gradually narrows from the first mounting portion toward the second mounting portion so that sound output from the speaker is focused on the focusing space portion; an emission space portion connected to the focusing space portion and configured to emit the sound toward the second mounting portion; and a dispersion space portion connected to the emission space portion and adjacent to the second mounting portion, the dispersion space portion being formed such that the dispersion space portion becomes gradually wider than the focusing space portion from the first mounting portion toward the second mounting portion so that the sound is dispersed and emitted toward the baffle plate.

In the present disclosure, there is an effect that the baffle body of the baffle blocks noise formed by a part of sound transformed in the space formed inside the ear cup and noise generated from outside the ear cup from mixing with sound output from the speaker.

In addition, sound is focused in the focusing space portion of the baffle body and is emitted to the dispersion space portion through the emission space portion, so that there is an effect that the sound becomes louder while the sound is dispersed.

For this reason, sound passing through the baffle of the present disclosure is clearly and loudly heard by the user's ear, and there is an effect that the sound with a good sound quality is transmitted to the user's ear.

In the present disclosure, since the second plate of the baffle body is widely supported on the first plate of the ear cup, there is an effect that noise that occurs when the baffle is shaken by an external force is prevented from occurring.

In the present disclosure, since the inner surface of the space of the baffle body is formed of the focusing curved surface, the emission curved surface, and the dispersion curved surface, a phenomenon in which sound collides and reflects is reduced, so that there is an effect that a movement direction of the sound is not obstructed and there is an effect that transformation of the sound due to collision and reflection of the sound is reduced.

For this reason, there is an effect that sound quality of sound is prevented from being degraded, and at the same time, the sound with a good sound quality is transmitted to the user's ear.

In the present disclosure, since the first mounting portion to which the speaker is mounted is formed on the baffle body such that the speaker is inclined so as to match the user's ear that is inclined, there is an effect that the center of the speaker and the center of the user's ear are almost in line with each other.

For this reason, since sound output from the speaker is directed to the user's ear that is inclined, there is an effect that the listening sensation is increased.

In the present disclosure, since noise is absorbed into the sound absorbing material in the space formed inside the ear cup, there is an effect that noise is further blocked from being mixed with sound output from the speaker from inside the baffle body.

Since dust is blocked by the dustproof net, there is an effect that dusts are prevented from being trapped in the plurality of through-holes of the baffle plate.

That is, there is an effect that the degradation of the sound quality of sound due to dust entrapment is prevented.

In the present disclosure, since the speaker having the diameter larger than the diameter of the speaker mounted on the first mounting portion of the baffle body may be mounted on the third mounting portion of the baffle body, the speaker is capable of being selected and mounted and, at the same time, there is an effect that the baffle is not required to be replaced according to the diameter size of the speaker.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 1 is a perspective view illustrating a headset according to an embodiment of the present disclosure;

FIG. 2 is an exploded perspective view illustrating the headset according to an embodiment of the present disclosure;

FIG. 3 is a cross-sectional view illustrating the headset according to an embodiment of the present disclosure;

FIG. 4 and FIG. 5 are partially enlarged views of FIG. 3;

FIG. 6 is a plan view illustrating a baffle body of the headset according to an embodiment of the present disclosure;

FIG. 7 is a cross-sectional view illustrating the baffle body of the headset according to an embodiment of the present disclosure taken along line A-A;

FIG. 8 is a side view illustrating the baffle body of the headset according to an embodiment of the present disclosure;

FIG. 9 and FIG. 10 are views illustrating a usage state of the headset according to an embodiment of the present disclosure; and FIG. 11 and FIG. 12 are a cross-sectional view and a partially enlarged view that are illustrating the baffle body of the headset according to a modified example of an embodiment of the present disclosure.

DETAILED DESCRIPTION OF THE INVENTION

Accordingly, an embodiment of the present disclosure as described above will be described in detail with reference to the accompanying drawings.

As illustrated in FIG. 1 to FIG. 10, a headset 1000 according to an embodiment of the present disclosure includes: a head band 100 which is worn on a user's head and which is provided with a head pad 110 provided at the center of the head band 100; a length adjustment member 200 including a plurality of length adjustment members 200, respectively, mounted on both sides of the head band 100 such that the length adjustment members 200 are capable of being moved along a longitudinal direction of the head band 100; an ear cup 300 which includes a plurality of ear cups 300 respectively mounted on the length adjustment members 200 such that the ear cups 300 are capable of being rotated and in which a speaker 410 mounted in a baffle 400 is embedded; an ear pad 500 including a plurality of ear pads 500 respectively mounted on the ear cups 300 such that the ear pads 500 face each other; a rotation member 600 mounted on one of the ear cups 300 at opposite side of the ear pad 500 such that the rotation member 600 is capable of being rotated, the rotation member 600 being provided with a microphone 610; and a cable 700 mounted on the ear cup 300 around the rotation member 600 and provided with a connection terminal 710 connected to the speaker 410 and the microphone 610.

Here, the head pad 110 provides a cushion sensation on the user's head, and the length adjustment members 200 are mounted on the both sides of the head band 100 such that the length adjustment members 200 are capable of being moved along the longitudinal direction of the head band 100 according to the length of the user's head.

In addition, the rotation member 600 has a first end provided with the microphone 610 and is configured as a multi-articulated arm, and the connection terminal 710 of the cable 700 is connected to a device such as a sound device.

In addition, the ear cup 300 is formed such that a first side of a space 310 formed inside the ear cup 300 is open and a first plate 320 protrudes outward from an open entrance of the space 310.

The baffle 400 includes a baffle body 420, the baffle body 420 being inserted into the space 310 of the ear cup 300, having a space 421 which is formed inside the baffle body 420 and which has both sides open, having a first mounting portion 422 which protrudes in an open entrance of a first side of the space 421 and which has a locking step 422*a* where the speaker 410 is locked and fitted thereto, having a second mounting portion 423 which protrudes in an open entrance of an opposite side of the space 421 and which has a locking step 423*a*, and having a second plate 424 which protrudes on an outer surface, i.e., a border of the second mounting portion 423 and which is attached to the first plate 320.

Here, the speaker 410 is fitted to the first mounting portion 422 and is attached by an adhesive member such as an adhesive and so on, a rear surface of the second plate 424 is attached to a front surface of the first plate 320 by an adhesive member such as a double-sided tape and so on, and the baffle body 420 is formed of a material such as plastic and so on.

In addition, the first mounting portion 422 is formed on the open entrance of the first side of the space 421 such that the first mounting portion 422 is inclined so that an angle θ is formed between the first mounting portion 422 and the second mounting portion 423.

The reason for this is that since the first mounting portion 422 to which the speaker 410 is mounted is required to be directed toward the user's ear that is inclined, the angle θ is formed between a first virtual line C1 that passes through the center of the first mounting portion 422 and a second virtual line C2 that passes through the center of the second mounting portion 423.

The baffle 400 includes a baffle plate 430 which is locked on the locking step 423*a* and which is fitted to the second mounting portion 423, the baffle plate 430 having an outer surface provided with a plurality of through-holes 431.

Here, the baffle plate 430 is fitted to the second mounting portion 423 and is attached by an adhesive member such as an adhesive, and is formed of a material such as plastic.

The space 421 includes: a focusing space portion 421*a* adjacent to the first mounting portion 422, the focusing space portion 421*a* being formed such that the focusing space portion 421*a* gradually narrows from the first mounting portion 422 to the second mounting portion 423 so that sound output from the speaker 410 is focused on the focusing space portion 421*a*; an emission space portion 421*b* connected to the focusing space portion 421*a* and configured to emit the sound toward the second mounting portion 423; and a dispersion space portion 421*c* connected to the emission space portion 421*b* and adjacent to the second mounting portion 423, the dispersion space portion 421*c* being formed such that the dispersion space portion 421*c* becomes gradually wider than the focusing space portion 421*a* from the first mounting portion 422 toward the second mounting portion 423 so that the sound is dispersed and emitted toward the baffle plate 430.

Here, a focusing curved surface 421*a*' having a curved shape is formed on an inner surface of the focusing space portion 421*a*, an emission curved surface 421*b*' having a curved shape is formed on an inner surface of the emission space portion 421*b*, and a dispersion curved surface 421*c*' having a curved shape is formed on an inner surface of the dispersion space portion 421*c*.

The reason for this is that an inner surface of the space 421 that sound can collide is curved so that the inner surface of the space 421 is not angular, and the sound is easily moved along the curved surface, so that a sound with a good sound quality is transmitted to the user's ear.

In addition, the ear pad 500 has a through-hole 510 formed through the center of the ear pad 500, and a fitting groove 520 to which the first and second plates 320 and 424 are fitted is formed on a first side of the through-hole 510.

Here, the user's ear is inserted into the through-hole 510, and the ear pad 500 provides a cushion sensation around the user's ear.

The headset 1000 includes a sound absorbing material 330 inserted into the space 310 of the ear cup 300, and includes a dustproof net 440 attached to the second plate 424.

Here, the sound absorbing material 330 is inserted into the space 310 of the ear cup 300 so that the sound absorbing material 330 is positioned at a rear side of the speaker 410, and the sound absorbing material 330 is formed of a material such as polyurethane and so on which have an excellent sound absorbing effect and excellent elasticity.

In addition, the dustproof net 440 is attached to a front surface of the second plate 424 by an adhesive member such as an adhesive, and is fitted to the fitting groove 520 of the ear pad 500 together with the second plate 424.

An operation and an effect of the headset 1000 according to an embodiment of the present disclosure configured as described above are described as follows.

As illustrated in FIG. 1 to FIG. 10, the speaker 410 is locked on the locking step 422*a* and is mounted on the first mounting portion 422, and the baffle plate 430 is locked on the locking step 423*a* and is mounted on the second mounting portion 423.

Then, the speaker 410 and the baffle plate 430 are mounted on the baffle body 420, thereby configuring the baffle 400.

In addition, after the sound absorbing material 330 is inserted into the space 310 of the ear cup 300, the second plate 424 of the baffle body 420 is attached to the first plate 320 of the ear cup 300 while the baffle body 420 is inserted into the space 410 of the ear cup 300.

Then, the speaker 410 is embedded in the ear cup 300 by the baffle 400, and the second plate 424 of the baffle 400 is supported on the first plate 320 of the ear cup 300.

Then, after the dustproof net 440 is attached to the second plate 424 of the baffle body 420, the first and second plates 320 424 and the dustproof net 440 are fitted to the fitting groove 520 of the ear pad 500.

Then, each pair of ear pads 500 is mounted on each pair of the ear cups 300 such that the pair of ear pads 500 faces each other.

Therefore, when the headset 1000 of the present disclosure is worn on the user's head, the angle θ is formed between the first mounting portion 422 and the second mounting portion 423. Therefore, the first mounting portion 422 is directed toward the user's ear that is inclined, and the speaker 410 mounted on the first mounting portion 422 is also directed toward the user's ear that is inclined.

In this state, after the connection terminal 710 of the cable 700 is connected to a sound device and so on, sound is output from the speaker 410.

The sound output from the speaker 410 passes through the space 421 of the baffle body 420, and the sound is easily guided along the focusing curved surface 421*a*', so that the sound is maximally focused on the focusing space portion 421*a* that is formed such that the focusing space portion 421*a* gradually narrows from the first mounting portion 422 toward the second mounting portion 423. Furthermore, the focused sound is easily guided along the emission curved surface 421*b*' and is emitted to the dispersion space portion 421*c* through the emission space portion 421*b*, and the focused sound is easily guided along the dispersion curved space 421*c*' and is dispersed at the dispersion space portion

421*c* that is formed such that the dispersion space portion 421*c* becomes gradually wider than the focusing space portion 421*a* from the first mounting portion 422 toward the second mounting portion 423, so that the focused sound becomes louder.

That is, the sound output from the speaker 410 is easily guided by the inner surface of the space 421 which is curved and which is configured to reduce a phenomenon in which the sound collides and reflects, so that the sound is easily moved to the baffle plate 430.

In addition, when the baffle body 420 outputs sound from the speaker 410, noise generated by a part of the sound being introduced into the rear side of the speaker 410, i.e., into the space 310 of the ear cup 300, is prevented from being introduced into the space 421, and noise generated from outside the ear cup 300 is also prevented from being introduced into the space 421.

In addition, the noise is absorbed by the sound absorbing material 330.

In addition, since the speaker 410 has the angle θ formed between the first virtual line C1 that passes through the center of the first mounting portion 422 and the second virtual line C2 that passes through the center of the second mounting portion 423, the speaker 410 is directed toward the user's ear that is inclined, so that the sound of the speaker 410 passing through the space 421 of the baffle body 420 is directed toward the user's inclined ear while the sound is passing through the plurality of through-holes 431 of the baffle plate 430.

Eventually, the sound of the speaker 410 is transmitted to the user's ear by the baffle 400 of the headset 1000 of the present disclosure while the sound is in a state in which the sound of the speaker 410 becomes louder without noise being added to the sound.

As illustrated in FIG. 11 and FIG. 12, a third mounting portion 425 protrudes in an outer surface of the first mounting portion 422 of the headset 100 according to a modified example of the present disclosure, the third mounting portion 425 having a locking step 425*a* where a speaker 410' having a diameter larger than a diameter of the speaker 410 is locked and fitted thereto.

Therefore, the speaker 410' having the larger diameter is locked on the locking step 425*a* and is fitted to the third mounting portion 425.

That is, instead of the speaker 410 according to an embodiment of the present disclosure, the speaker 410' having the diameter larger than the diameter of the speaker 410 may be mounted on the third mounting portion 425.

Although preferred embodiments of the present disclosure have been disclosed for illustrative purposes, those skilled in the art will appreciate that various modifications, additions and substitutions are possible, without departing from the scope and spirit of the present disclosure as disclosed in the accompanying claims.

What is claimed is:

1. A headset comprising:

a head band (100) which is worn on a user's head and which is provided with a head pad (110) provided at a center of the head band (100);

a length adjustment member (200) comprising a plurality of length adjustment members (200) mounted on both sides of the head band (100) such that the length adjustment members (200) are capable of being moved along a longitudinal direction of the head band (100);

an ear cup (300) which comprises a plurality of ear cups (300) respectively mounted on the length adjustment members (200) such that the ear cups (300) are capable of being rotated and in which a speaker (410) mounted in a baffle (400) is embedded;

an ear pad (500) comprising a plurality of ear pads (500) respectively mounted on the ear cups 300 such that the ear pads (500) face each other;

a rotation member (600) mounted on one of the ear cups (300) at an opposite side of the ear pad (500) such that the rotation member (600) is capable of being rotated, the rotation member (600) being provided with a microphone (610); and a cable (700) mounted on the ear cup (300) around the rotation member (600) and provided with a connection terminal (710) connected to the speaker (410) and the microphone (610), wherein the ear cup (300) is configured such that a space (310) in which the speaker (410) mounted in the baffle (400) is embedded is formed inside the ear cup (300), a first side of the space (310) is open, and a first plate (320) is formed on an open entrance of the space (310), and the ear pad (500) has a through-hole (510) formed through a center of the ear pad (500), and a fitting groove (520) to which the first plate (320) is fitted is formed on a first side of the through-hole (510), wherein the baffle (400) comprises:

a baffle body (420), the baffle body (420) being inserted into the space (310) of the ear cup (300), having a space (421) which is formed inside the baffle body (420) and which has both sides open, having a first mounting portion (422) which is formed on an open entrance of a first side of the space (421) and which has a locking step (422*a*) where the speaker (410) is locked and fitted thereto, having a second mounting portion (423) which is formed on an open entrance of an opposite side of the space (421) and which has a locking step (423*a*), and having a second plate (424) which is formed on an outer surface of the second mounting portion (423) and which is fitted to the fitting groove (520) of the ear pad (500) while the second plate (424) is attached to the first plate (320); and a baffle plate (430) which is locked on the locking step (423*a*) and which is fitted to the second mounting portion (423), the baffle plate (430) having an outer surface provided with a plurality of through-holes (431), and the space (421) comprises:

a focusing space portion (421*a*) adjacent to the first mounting portion (422), the focusing space portion (421*a*) being formed such that the focusing space portion (421*a*) gradually narrows from the first mounting portion (422) toward the second mounting portion (423) so that sound output from the speaker (410) is focused on the focusing space portion (421*a*);

an emission space portion (421*b*) connected to the focusing space portion (421*a*) and configured to emit the sound toward the second mounting portion (423); and a dispersion space portion (421*c*) connected to the emission space portion (421*b*) and adjacent to the second mounting portion (423), the dispersion space portion (421*c*) being formed such that the dispersion space portion (421*c*) becomes gradually wider than the focusing space portion (421*a*) from the first mounting portion (422) toward the second mounting portion (423) so that the sound is dispersed and emitted toward the baffle plate (430).

2. The headset of claim 1, wherein a focusing curved surface (421*a*') is formed on an inner surface of the focusing space portion (421*a*), an emission curved surface (421*b*') is formed on an inner surface of the emission space portion (421*b*), and a dispersion curved surface (421*c*') is formed on an inner surface of the dispersion space portion (421*c*).

3. The headset of claim 1, wherein the first mounting portion (422) is formed on the open entrance of the first side of the space (421) such that the first mounting portion (422) is inclined so that an angle (θ) is formed between the first mounting portion (422) and the second mounting portion (423).

4. The headset of claim 1, wherein a sound absorbing material (330) is inserted into the space (310) of the ear cup (300).

5. The headset of claim 1, wherein a dustproof net (440) is attached to the second plate (424).

6. The headset of claim 1, wherein a third mounting portion (425) is formed on an outer surface of the first mounting portion (422), the third mounting portion (425) having a locking step (425*a*) where a speaker (410') having a diameter larger than a diameter of the speaker (410) is locked and fitted thereto.

* * * * *